Feb. 14, 1956 E. O. KEIZER ET AL 2,735,004

AUTOMATIC GAIN CONTROL SYSTEMS

Filed Jan. 4, 1954

INVENTORS
EUGENE O. KEIZER
& MARLIN G. KROGER
BY [signature]
ATTORNEY 2,735,004
Patented Feb. 14, 1956

2,735,004

AUTOMATIC GAIN CONTROL SYSTEMS

Eugene O. Keizer, Princeton, N. J., and Marlin G. Kroger, Oak Park, Ill., assignors to Radio Corporation of America, a corporation of Delaware Application January 4, 1954, Serial No. 402,008
9 Claims. (Cl. 250—20)

The present invention relates to improvements in automatic gain control circuits for radio receiving systems and more particularly, although not necessarily exclusively, to automatic gain control circuits of the type useful in television signal receiving equipment.

The function of an automatic gain control (AGC) circuit in radio receiving equipment is to maintain the demodulated signal output at a substantially constant level over wide ranges of variation in input signal strength. In general, to accomplish this action, means must be provided for developing a control potential whose value varies as a function of the incoming signal carrier strength applied to the receiver. In television receiving systems signal carrier intensity is measured by either peak detection of the demodulated signal or sampling the value of the demodulated signal only during synchronizing pulses.

In a simple peak detection forms of AGC for television receivers it is apparent that the receiver becomes vulnerable to strong bursts of static or "noise." This comes about because the peak detector circuit has no way of differentiating between maximum excursions of the demodulated signal corresponding to sync pulses and noise excursions which may extend beyond sync pulse height. In order to protect the automatic gain control system from noise bursts, keyed forms of AGC circuits have been developed in which the horizontal flyback pulses of the television receiver horizontal deflection system are used to activate the AGC circuit voltage measuring means only during the reception of horizontal synchronizing pulses. The keying action effectively desensitizes the AGC circuit during intervals between successive horizontal synchronizing pulses and, therefore, increases the noise immunity of the circuit.

However, it has been found that the keying action is disadvantageous in certain instances during the reception of strong signals (in connection with which noise bursts are inherently less troublesome). For example, in a keyed AGC system for a television receiver, let it be assumed that the television channel selector switch is suddenly tuned to a strong signal with the set having just previously been operating to receive a weak signal. If coincidence is not immediately established between the received synchronizing pulse and the horizontal deflection circuit flyback pulse no correction in the gain of the receiver will take place. As a result the signal amplifiers of the receiver may, at least for a moment, be severely overloaded to the extent of interfering with proper synchronizing signal separation and the consequent loss of control of the television receiver deflection circuits. In some instances the deflection circuits of the receiver may synchronize on portions of the received video signal other than the synchronizing pulses themselves. Moreover, it has been noted that in keyed AGC systems rotation of the horizontal hold control of the television receiver produces picture bending during the reception of strong signals. Picture bending is due to a change in the coincidence of the sync pulse and the keying pulse as the horizontal hold control is rotated.

As a consequence of the conflicting requirements in a television receiving system, referred to above, it may be generally stated that a keyed form AGS is preferable to an unkeyed form in the reception of weak signals, but that an unkeyed form of AGC is preferable to the keyed form of AGC during the reception of strong signals.

It is, therefore, an object of the present invention to provide an automatic gain control system for television receivers in which an automatic change from keyed to unkeyed operation is accomplished as a function of the incoming signal strength.

It is another object of the present invention to provide an improved form of automatic gain control system in which both keyed and unkeyed AGC action is made available and one form is automatically selected as a function of received signal strength.

It is yet another object of the present invention to provide an automatic gain control circuit which exhibits a smooth transition characteristic between keyed to unkeyed operation as the received signal strength applied to the circuit increases in intensity.

In the realization of the above objects and features of advantage, the present invention contemplates the utilization of means coupled with the automatic gain control system of the receiver to change its operation from a keyed mode to an unkeyed mode in response to a control influence. Means are then provided responsive to the developed automatic gain control potential of the system for influencing the mode changing means as a function of received signal strength.

A more complete understanding of the present invention, as well as a fuller appreciation of its objects and features of advantage will be gleaned from a reading of the following specification, especially when taken in connection with the accompanying drawings, in which.

Figures 1, 2:
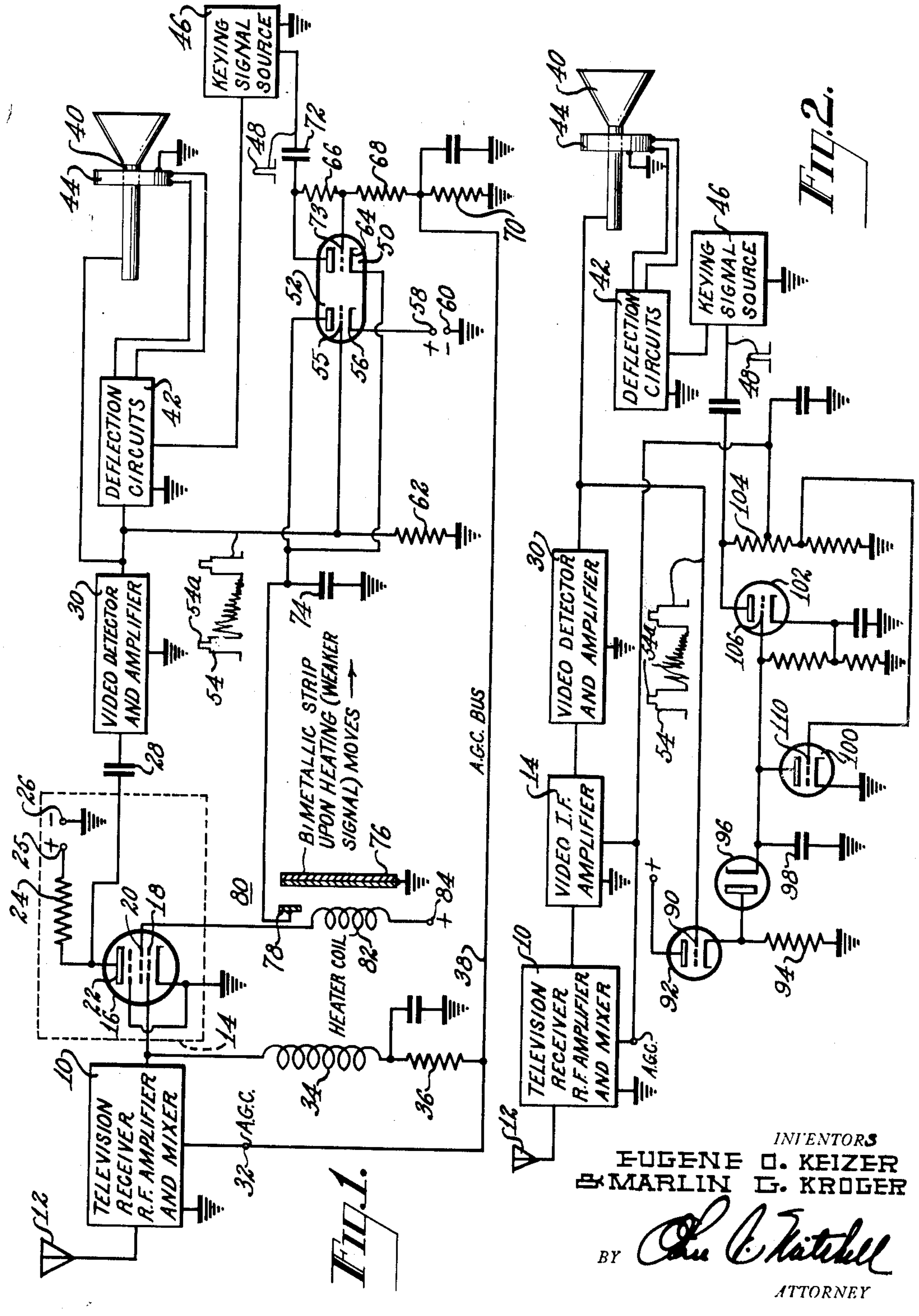
Figure 1 is a combination block and schematic representation of a television receiving system embodying the novel features of the present invention.
Figure 2 is a combination block and schematic representation of a television receiving system embodying still another form of the present invention.

Turning now to Figure 1, there is indicated in block form at 10 the well known components comprising the tuner section of a television receiver. Signals impressed on the antenna 12 are amplified and heterodyned in the tuner 10 and applied to a video intermediate frequency amplifier shown within the dotted line rectangle 14. The intermediate frequency amplifier shown comprises a tube 16 having a control electrode 18, screen electrode 20 and anode 22. The anode 22 is connected through a load resistor 24 to a source of positive potential 25 whose negative terminal 26 is connected with circuit ground. Amplified signals appearing at the anode 22 are respectively coupled via a coupling capacitor 28 to a video detector and amplifier circuit 30. In practice, the amplifier 14 may be supplemented with other video intermediate frequency amplifiers in order to apply a greater signal level to the video detector 30.

Automatic gain control voltage may be applied to the tuner 10 at terminal 32 and applied to the video I. F. amplifier 14 through the decoupling inductor 34 and resistor 36. The development of an automatic gain control potential on the AGC bus 38 will be discussed hereinafter.

Demodulated video signal appearing at the output circuit of the video detector and amplifier 30 is applied to the kinescope 40 for picture modulation of the beam therein. Video signal is also applied to the deflection circuits 42 which drive the deflection coil 44 surrounding the neck of the kinescope 40. A keying pulse signal source 46 is coupled with the deflection circuits 42 for developing a keying pulse 48 bearing synchronous relation to the output of the deflection circuits 42.

The automatic gain control circuit illustrated in Figure 1 comprises a first and second electron discharge tube amplifiers 50 and 52, respectively. Incoming demodulated video signal 54 appearing at the output terminal of the video detector and amplifier 30 is applied with sync positive polarity to the control electrode 55 of tube 52. The cathode 56 is connected with a source of bias potential having a positive terminal at 58 and a negative terminal 60, which is itself connected with circuit ground. Grid return resistor 62 is connected between the control electrode 55 and circuit ground. The cathode 64 of tube 50 is connected directly with the anode of tube 52, while the anode of tube 50 is connected with circuit ground through load resistors 66, 68 and 70. The keying pulses 48 are capacitively coupled via the condenser 72 to the anode of tube 50, the control electrode 73 of tube 50 is connected at the junction of resistors 66 and 68.

In accordance with the present invention a capacitor 74 of extremely small value may be connected between the anode of tube 52 and circuit ground. However, this capacitor 74 is supplemented by the capacity between bimetallic strip 76 and stator plate 78 of the variable capacitance unit 80. In accordance with the present invention, the bimetallic strip 76 is caused to move with respect to the stator 78 by means of a heater coil 82 through which screen electrode supply current for the amplifier 14 must pass. For this purpose the heater coil is connected between the screen electrode 20 of tube 14 and a source of positive potential 84 whose negative terminal may be connected with circuit ground (not shown).

Purely by way of example, the variable capacitance element 80 has been shown to be constructed such that the bimetallic strip 76 upon heating by the heater coil 82 will move away from the stator 78 and thereby decrease the capacity existing between the anode of tube 52 and circuit ground.

In order to understand the operation of the present invention, it is first necessary to understood the manner in which tubes 50 and 52 provide an automatic gain control voltage across the resistor 70. The amplifier tube 50 may be considered as a peak rectifying device for the keying pulse 48, with the capacitor 74 acting as a storage capacitor. The amplifier tube 52 may be considered as a discharging device for the capacitor 74 and acts to discharge this capacitor to an extent directly proportional to the amplitude of the synchronizing pulses 54*a* of the received demodulated signal 54. The greater the magnitude of received signal, the greater the extent to which capacitor 74 will be discharged by the tube 52. Discharge of capacitor 74, of course, means that greater current must be supplied by the amplifier tube 50 to recharge the capacitor 74. This charging current will necessarily flow through the load resistors 66, 68 and 70 connected with the anode of tube 50. In other words, the stronger the received signal the more capacitor 74 will be discharged and the greater the negative voltage developed across the resistor 70 will be.

If capacitor 74 is made large enough the charge remaining on the capacitor between horizontal synchronizing pulses will be sufficient to permit conduction of tube 52 at any time provided the signal applied to its grid 55 is sufficiently positive. Correspondingly, upon the occurrence of a keying pulse 48 the tube 50 would then become conductive to an extent depending upon how much charge has been drained from the capacitor 74. The negative voltage appearing across resistor 70 will, therefore, represent unkeyed automatic gain control action since coincidence between the keying pulse 48 and arriving synchronizing pulses is not necessary in order to develop an automatic gain control voltage.

However, if capacitor 74 is made small enough, so that the charge thereon is quickly dissipated upon the initial conduction of tube 52, the amount of current demanded by the tube 50 will be so small that no appreciable AGC voltage will be developed across resistor 70. Under these conditions, where capacitor 74 is extremely small, the only time appreciable current will flow in the tube 50 is during the coincidence of the keying pulse 48 and arriving synchronizing pulse. This is apparent, since during the arrival of a synchronizing pulse, tube 52 will be rendered conductive regardless of the value of capacitor 74, provided a keying pulse 48 occurs simultaneously and renders the anode 52 positive with respect to the cathode 56. Under these conditions the voltage developed across resistor 70 will represent keyed automatic gain control action.

It is, therefore, possible in accordance with the present invention to cause the capacity existing between the anode of tube 52 and circuit ground to vary in accordance with signal strength. For strong signals, the effective capacity at this point in the circuit should be larger so as to provide a type of AGC circuit action unkeyed in nature. For weak signals the capacity at this point in the circuit should be very small so as to provide keyed AGC circuit action which yields greater noise immunity. Since the screen electrode current of the intermediate frequency amplifier tube 16 becomes greater as the AGC bias on the tube 16 becomes more positive (corresponding to weak signal reception), it is apparent that the heater coil 82 will emit more heat during the reception of weaker signals. This will cause the bimetallic strip 76 to move away from the stator 78 and reduce the capacity existing between the anode of tube 52 and circuit ground. This reduction in capacity may be made sufficient to invoke keyed circuit action in the AGC system.

Contrariwise, as the received signal increases in intensity, the developed AGC potential will become greater and the negative control electrode bias applied to the tube 16 will become greater in magnitude. This in turn will reduce the average current flowing through the heater coil 82 and allow the bimetallic strip 76 to move towards the stator 78 and increase the capacitance appearing from the anode of tube 52 to circuit ground. As described above, this will tend to produce an unkeyed type of AGC circuit action.

Since the variable capacitance means 80 is in effect coupled with the AGC system and is also responsive on a continuous basis to changes in intensity of the received signal, it is apparent that the transition of the AGC circuit operation from a keyed mode (while receiving weak signals) to an unkeyed mode (when receiving a strong signal) is rendered a continuous function of received signal strength over reasonable ranges of intensity variation.

Although the bimetallic variable capacitance unit of Figure 1 is a convenient way of accomplishing the desired control of circuit operation, it is, within the scope of the present invention, to provide other means for changing the AGC circuit operating condition from keyed to unkeyed or vice versa. For example, in Figure 2, another form of automatic gain control circuit is shown in connection with the same television receiver circuit arrangement shown in Figure 1. For illustrational convenience, like circuit elements of Figures 1 and 2 have been given like numerical designations. In Figure 2 the received video signal 54 is applied to the control electrode 90 of a cathode follower amplifier 92. The output signal from the amplifier 92, appearing across the cathode load resistor 94, is peak detected by means of the diode 96 to charge the storage capacitor 98. The voltage appearing across the capacitor 98 therefore represents the peak of the synchronizing signal waveform 54*a*, as delivered by the cathode follower. A control tube 100 is connected in shunt with the capacitor 98 to provide means for varying the time constant of the load into which the peak detector 96 operates. The tube 100 may be considered as a variable resistance means in shunt with the capacitor 98.

In further accordance with the present invention, a pulsed amplifier tube 102 is provided. The pulsed amplifier tube 102 effectively rectifies the keying pulses 48 to develop a negative automatic gain control potential at points along the load resistor 104. Since the potential appearing across the capacitor 98 is applied to the control electrode 106 of the pulsed amplifier 102, the magnitude of the negative AGC voltage developed along the load resistor 104 will be a function of the potential applied to the control electrode 106.

If, in accordance with the present invention, the time constant of the peak detector circuit 96 is made long, due to very low conduction in tube 100, it will be immaterial as to when the keying pulse 48 pulses the amplifier 102 in relation to arriving sychronizing signals. If, however, the conduction of tube 100 is made greater, the time constant of the peak detector circuit involving the diode 96 will be so short that voltage will appear across capacitor 98 only during reception of a synchronizing pulse. Under these conditions, it will be necessary for the keying signal 48 to coincide with the received synchronizing pulse in order to develop an automatic gain control potential along the load resistor 104.

There is, therefore, provided in accordance with the present invention a connection between the control electrode 110 of the amplifier 100 to a point along the load resistor 104. As a result, the conductance of tube 100 will be rendered an inverse function in magnitude to received signal strength. Thus, during weak signals the conductance of tube 100 will be greatest and the time constant of the peak detector circuit involving tube 96 will be shortest. This provides keyed action in the AGC system. During the reception of strong signals the negative voltage applied to the control electrode 110 of tube 100 becomes greater in magnitude and reduces the conductance of the tube. This increases the effective time constant of the peak detector circuit and results as hereinabove described in a form of unkeyed AGC operation.

It is noted that the variable capacitance means of Figure 1 could be utilized in shunt with the capacitor 98 of Figure 2, and that the variable resistance means 100 of Figure 2 could be used in shunt with the capacitor 74 of Figure 1, without departing from the spirit and scope of the present invention.

In the above described embodiments of the present invention shown in Figures 1 and 2, certain elements thought to be well known in the art have been illustrated in block diagram form. This has permitted more effective illustrational highlighting of the contribution applicants' invention has made to the art. Details concerning suitable known circuitry for the blocks shown, such as the R. F. amplifier, mixer, video detector, deflection circuits and keying signal source may be obtained from an article entitled "Television Receivers" published in the "RCA Review" for March 1947, beginning at page 5 thereof. Those features of the embodiments shown which are peculiar to the present invention have, however, been described at length in the preceding specification and are set forth more particularly in the appended claims.

What is claimed is:

1. In a radio receiving system, the combination of: a signal amplifying means for amplifying received signals; means connected with said amplifying means for controlling the gain thereof as a function of an automatic gain control potential; automatic gain control voltage developing means connected with said amplifying means for developing an automatic gain control potential as a function of received signal strength; means for applying said automatic gain control potential to said gain controlling means; means coupled with said gain controlling means for controlling its operating mode as to keyed or unkeyed operation, said mode controlling means being responsive to a control voltage; and means for applying an electrical version of said automatic gain control potential to said mode controlling means to define its operating mode as a function of received signal strength.

2. A radio receiving system, according to claim 1, characterized by the provision of means including said mode controlling means and said operating mode defining means for causing said automatic gain control voltage developing means to assume keyed operation for the weaker class of received signals and unkeyed operation for the stronger class of received signals.

3. A radio receiving system according to claim 2, wherein said amplifying means demands different power supply requirements as a function of gain; and means responsive to the power supply demands of said amplifying means for developing said electrical version of said automatic gain control potential.

4. In a radio signal receiving system, the combination of: a signal amplifying means for amplifying received signals; an automatic gain control circuit controllably capable of either a keyed or unkeyed mode of operation; signal coupling means connected from said amplifier to said gain control means to supply said gain control means with received signal information; means coupled with said amplifier for developing an automatic gain control circuit operating mode control signal as a function of received signal strength; and signal responsive means coupled with said operating mode control signal developing means and said automatic gain control circuit to control its mode of operation as a function of received signal strength.

5. A radio signal receiving system according to claim 4 wherein means are additionally provided and conditionally included in one of said operating mode control signal means for influencing said gain control circuit toward a keyed mode of operation for weaker signals and an unkeyed mode for stronger signals.

6. In an automatic gain control system for an amplifying means, the combination of: an amplifying means adapted for gain control in accordance with a control signal; a source of recurrent charging signal; capacitance means; a first unilateral conduction means coupling said source of charging signal in charging relation to said capacitance means; a second unilateral conduction means coupled between said amplifying means and said capacitance means in discharging relation thereto such as to tend to discharge said capacitance means as a function of received signal intensity; means coupled with said first unilateral conduction means for developing an automatic gain control potential for said amplifying means; and means coupled with said amplifying means and said capacitance means for controlling the effective value of said capacitance means as a function of received signal intensity.

7. An automatic gain control system, according to claim 6, wherein said capacitance means comprises a heat sensitive element, the temperature of which determines in part the effective capacitance value of said capacitance means; means applying said automatic gain control potential to said amplifying means such as to vary the power requirements of said amplifying means as a function of amplifying means gain; and heat developing means connected with said amplifying means to develop heat as a function of amplifying means power supply requirements, said heat developing means being in physical relation to said capacitance means to affect said heat sensitive element.

8. An automatic gain control system, according to claim 6, wherein said source of recurrent signal is coupled with said amplifying means to provide recurrent signals conditionally synchronous with signals delivered by said amplifying means; and wherein the minimum value of said capacitance means is such that when taken in conjunction with inherent circuit resistance values conditionally in shunt therewith, the time constant value of said capacitance means and said inherent resistance is shorter than the period of said recurrent signal.

9. In an automatic gain control system, the combination of: an amplifier designated to handle signals having a recurrent component; a charge storing load circuit; unilateral conduction means connected with said amplifier and said load circuit for charging said load circuit as a function of recurrent components of amplified signal whereby to develop across said load circuit an indicating voltage suitable for deriving an automatic gain control potential; means coupled with said load circuit for changing the time constant value thereof from either a value shorter than said recurrent component to a value longer than said recurrent component; and a variable capacitance means coupled with said amplifier and said last named means for controlling said time constant changing means as a function of received signal strength.

References Cited in the file of this patent

UNITED STATES PATENTS

| | | |
|---|---|---|
| 2,569,289 | Clark | Sept. 25, 1951 |
| 2,586,760 | Bedford | Feb. 19, 1952 |
| 2,593,011 | Cotsworth | Apr. 15, 1952 |
| 2,627,022 | Anderson | Jan. 27, 1953 |
| 2,635,184 | Cotsworth | Apr. 14, 1953 |